United States Patent [19]

Ackley

[11] 4,041,604
[45] Aug. 16, 1977

[54] METHOD OF TERMINATING AN ELECTRICAL WIRE IN AN INSULATING HOUSING

[75] Inventor: George Nelson Ackley, Hershey, Pa.

[73] Assignee: AMP Incorporated, Harrisburg, Pa.

[21] Appl. No.: 694,753

[22] Filed: June 10, 1976

Related U.S. Application Data

[62] Division of Ser. No. 618,649, Oct. 1, 1976, Pat. No. 3,984,908.

[51] Int. Cl.² .................................................. H01R 43/00
[52] U.S. Cl. ......................................................... 29/628
[58] Field of Search ......... 29/205 R, 205 D, 203 DT, 29/203 DS, 203 D, 203 P, 596, 628, 630 R; 310/71; 339/97 R, 97 P, 98, 99 R

[56] References Cited

U.S. PATENT DOCUMENTS

| | | | |
|---|---|---|---|
| 2,443,457 | 6/1948 | Herman | 29/596 UX |
| 3,562,904 | 2/1971 | Lau et al. | 29/628 |
| 3,813,763 | 6/1974 | Church | 29/596 |
| 3,861,026 | 1/1975 | Swaim | 29/596 |
| 3,867,658 | 2/1975 | Dochterman | 310/71 |
| 3,899,236 | 8/1975 | Santos | 339/98 |
| 3,912,356 | 10/1975 | Johansson | 339/98 |
| 3,920,305 | 11/1975 | Scott | 339/98 |
| 3,974,407 | 8/1976 | Dochterman | 310/71 |
| Re. 26,208 | 5/1967 | Tupper | 29/596 UX |

*Primary Examiner*—James R. Duzan
*Attorney, Agent, or Firm*—Robert W. Pitts; William J. Keating; Frederick W. Raring

[57] ABSTRACT

An apparatus for attaching slotted plate terminals or the like to individual wires such as the wires of a stator coil in an induction motor is disclosed. A rotatable arbor positions the stator in alignment with an insertion track and ram. A terminal is inserted by moving it along the tracks and into a cavity in an insulating housing mounted on the stator. A guide track along which an insertion ram moves a terminal also acts as a depth control for accurate positioning of the terminal.

4 Claims, 13 Drawing Figures

METHOD OF TERMINATING AN ELECTRICAL WIRE IN AN INSULATING HOUSING

This is a division of application Ser. No. 618,649 filed Oct. 1, 1976, now Pat. No. 3984908.

BACKGROUND OF THE INVENTION

1. Field of Invention

This invention relates to the termination of electrical wires used in induction coils. Termination is accomplished by using a slotted contact terminal. The use of such a solderless termination technique leads to more rapid termination of coil wires when used with applicator apparatus of the type disclosed herein.

2. Description of the Prior Art

The termination of wires by the insertion of contact terminals into an insulating housing can be used in various applications. The specific embodiment shown is the termination of coil wires in an induction motor stator. Other representative methods of terminating stator coil wire are shown in U.S. Pat. Nos. 3,725,707, 3,861,026, and Reissue Pat. No. 26,208.

This method of terminating an electrical wire is not limited to use with a stator coil. For example, the method as claimed might be used in the assembly of an electrical harness for an appliance. The prior art does contain examples in which a wire is laced in an insulating housing prior to attaching a contact terminal. U.S. Pat. No. 3,668,301 discloses a connector in which the wires are wedged into a cavity by a plug element to effect a splice. U.S. Pat. Nos. 3,631,378 and 3,812,449 also disclose splicing modules in which a wire is first laced into position and then terminated.

SUMMARY OF THE INVENTION

An apparatus for inserting contact terminals into appropriate cavities in an insulating housing is used in conjunction with a mounting means which has indexing means for positioning the cavities. Wires are laced across the cavities so that when the terminal is inserted into the cavities, electrical contact is established with the wire. This apparatus and method can be used in a number of different situations, but it is especially useful when used to terminate magnet wires in a coil of a stator of an induction motor. The present embodiment is adapted for just such a use, but the invention is equally applicable to the termination of wires of a different character when used with various other devices.

In this embodiment, the cavities are located about the circumference of the cylindrical stator and a rotatable arbor is used for mounting the stator and indexing the cavities. Terminals are strip fed and delivered to an insertion track which guides an insertion ram. The insertion track acts not only as a guide for the insertion ram but also acts as a depth control means which assures proper insertion of the terminal into the cavity and of the wire into the terminal.

Accordingly, the objects of this invention include provision of an apparatus and method for termination of wires by moving the terminals into a housing cavity. Another object is to provide means for accurately positioning the wire in the conductor receiving means of the terminal. One other object is to provide a mounting and indexing means for sequentially aligning the individual terminal cavities with a single insertion ram. Still another object is to provide an insertion mechanism which is readily adaptable for use with insulating housings having a wide variety of cavity spacing and configurations. Also, the insertion mechanism is readily adaptable to multiple insertion rather than the single insertion embodiment herein disclosed. These and other objects are accomplished by the disclosed embodiment as well as for numerous other embodiments which are within the scope of this invention and differing only in certain nonessential details.

Brief Description of the Drawings

FIG. 3 is a sectional side view of the insertion mechanism showing the initial or retracted position of the insertion ram.

Detailed Description of the Drawings

Figure 1:
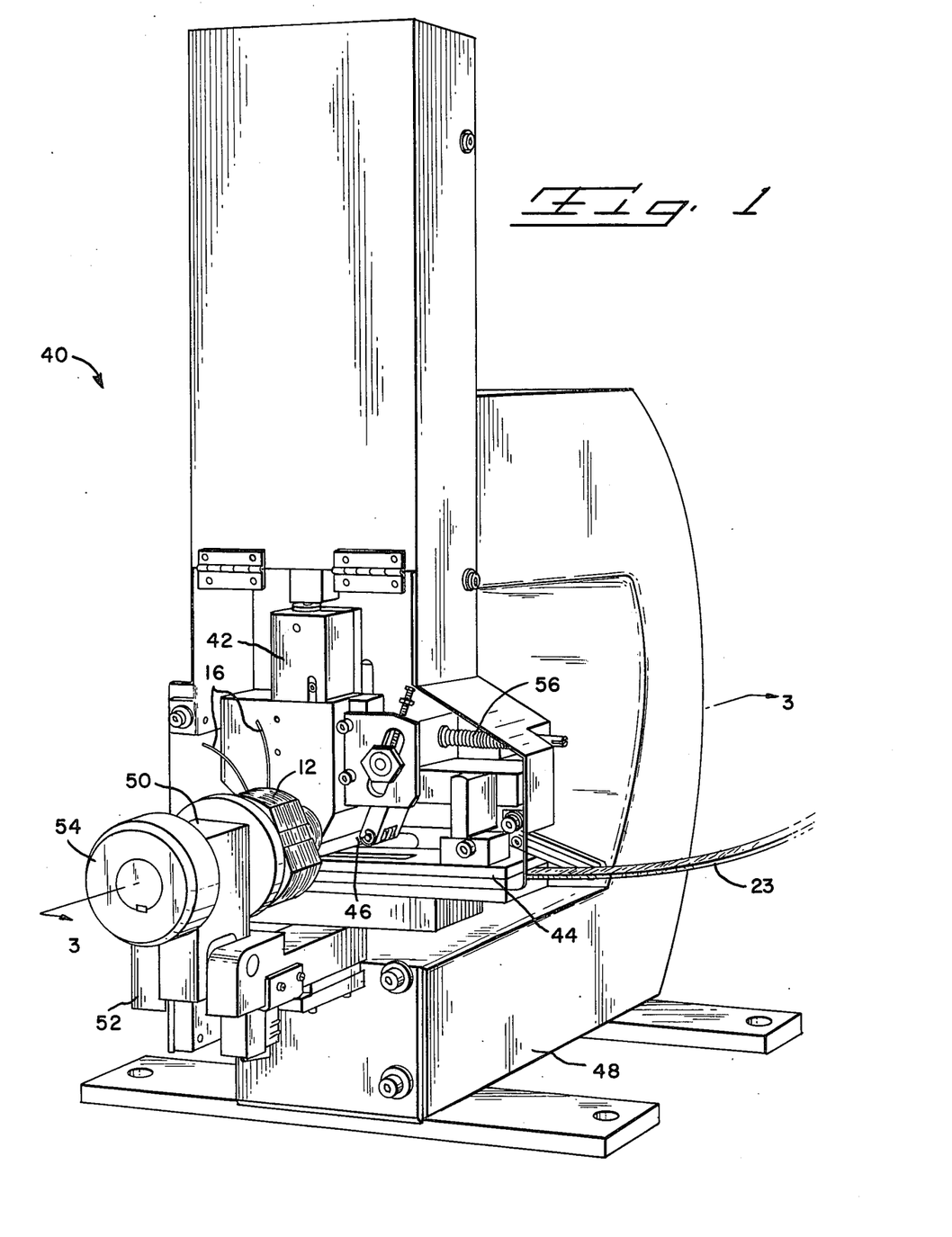
FIG. 1 is a perspective view of the terminal assembly machine.

FIG. 1 is a perspective view showing the stator terminal assembly machine 40. A stator 12 has been mounted on arbor 50 and is in position for insertion of individual terminals. An upright punch 42 is shown immediately above stator 12. This punch moves vertically to sever individual terminals from a carrier strip 23 which is shown entering the machine from the right. This carrier strip travels along a terminal feed track 44 to a position immediately opposite stator 12. Terminal feed arm 46 acts to move the terminal strip to the left so that individual terminals are fed into the vicinity of a loading station.

Figure 2:
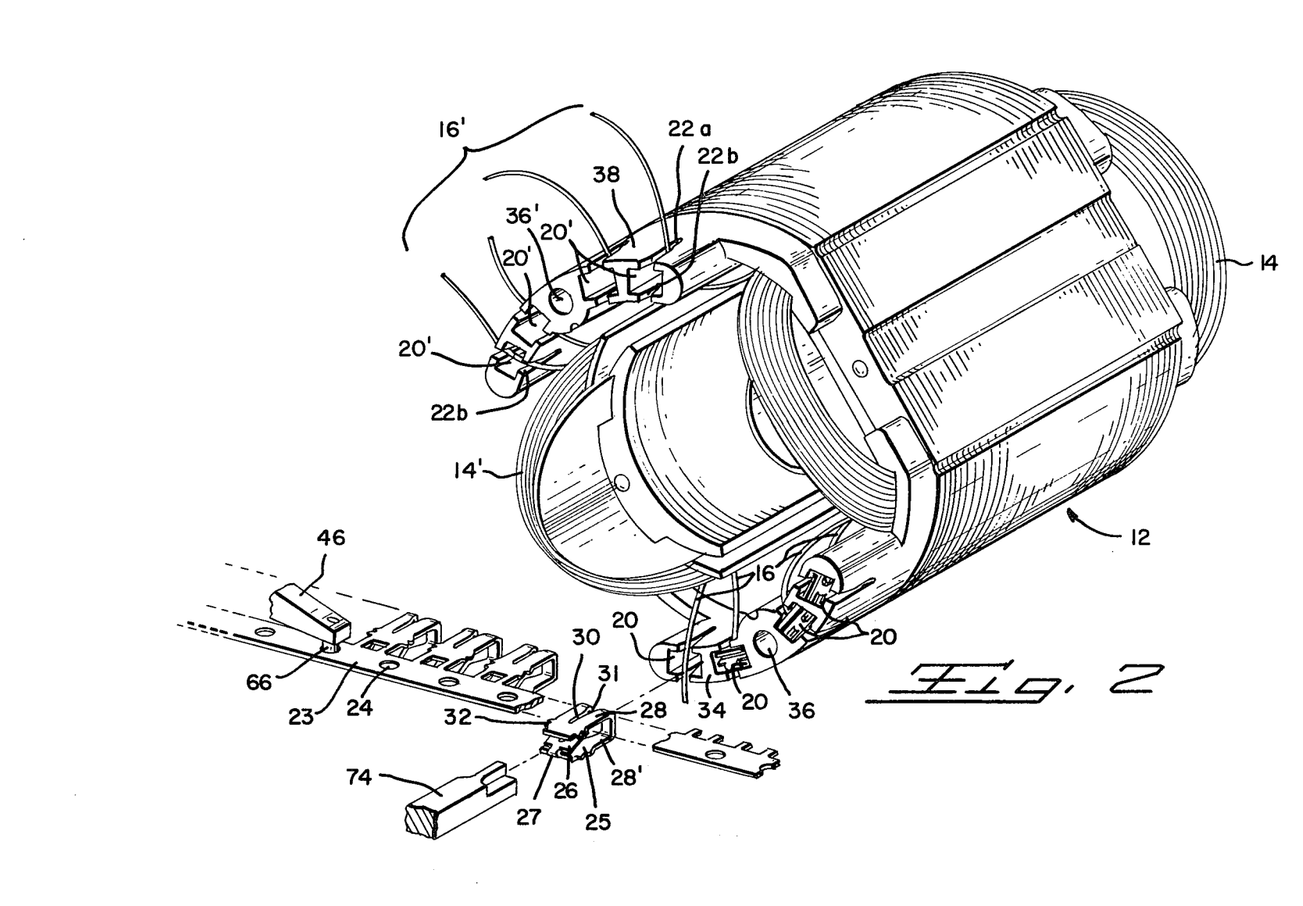
FIG. 2 shows a stator for an induction motor with a terminal housing attached on one end and a carrier strip of individual terminals.

FIG. 2 illustrates details of the stator 12, plastic terminal housing 18 and slotted terminals 25. Plastic terminal housing 18 has been mounted on one end of the stator 12. The coils 14 and 14' are wrapped around portions of the terminal housing securing them to the stator. The terminal housing 18 has four terminal cavities 20, 20' located on its opposite sides. These cavities are located on the periphery of stator 12. A circular hole 36, 36' is located in the center of each terminal cavity housing portion. The individual terminal cavities 20 and 20' are rectangular, but they could be circular or, in fact, any desirable shape which conforms to an appropriate terminal. Each cavity has a slot 22 in two opposite sidewalls, one along the outer wall of the stator and one along the inner wall of the stator. Separate coil wire ends 16 and 16' have been laced into slots 22 in each cavity and captured therein so that the wire spans the cavity. These wires extend across the outer face of the stator housing as shown.

Terminal carrier strip 23 is positioned along the front of stator 12. Carrier strip 23 has a number of individual terminals 25 extending from one side of the carrier strip and also has a number or circular holes 24 along its length. Terminal feed arm 46 and terminal feed finger 66 are shown mated with one of advance holes 24. One terminal 25 is shown severed from carrier strip 24. This terminal has opposite sidewalls 28 and 28' with aligned slots 30, 30' which serve as conductor receiving means in each sidewall. Wire-receiving end 31 is located adjacent to one terminal cavity 20 and can be termed the leading end. Terminal 25 has a deflected tab 26 extending from the rear of one sidewall 28'. Tab 26 is connected to sidewall 28' by curved strip 27. Tab 26 is intended for use in conjunction with an external wire, not shown. Each coil wire is to be connected with such an external wire. This tab is only illustrative of a number of different structures which could be used to contact one or more external wires or a separate terminal to which such wires may be attached. Each terminal has a number of lances 32 located on the edge of each sidewall. When each terminal is inserted into a cavity 20, these lances serve to anchor the terminal in the cavity by digging into its plastic walls.

Insertion ram 74 is shown in alignment with this single terminal and with one terminal cavity. This figure shows that three terminals have already been inserted into appropriate terminal cavities.

Figures 9, 10:
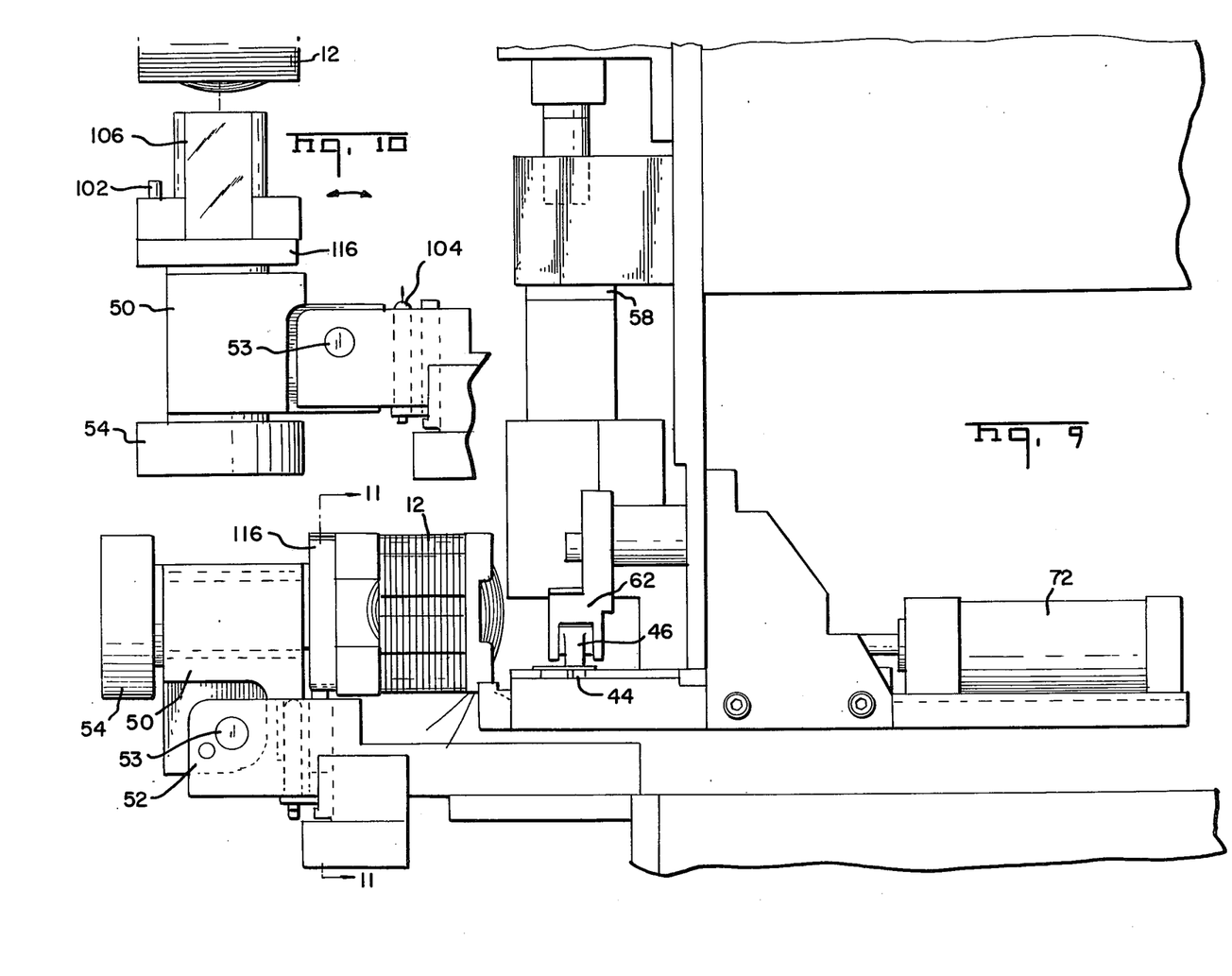
FIG. 9 is a side view of the machine showing the stator mounted on a hinged arbor which has been rotated into position for terminal insertion.
FIG. 10 is a hinged arbor in its open position.

FIG. 9 is a sideview or a stator 12 shown mounted on arbor 50. FIG. 10 shows arbor 50 in its mounting position with a stator algined with the arbor.

Arbor 50 rotates about its axis 50 as well as about pivot 53. A circular knob 54 is located at one end of arbor 50. The arbor is hinged about point 53 between knob 54 and cylindrical mounting portion 106. In the position of FIG. 10 a stator can be easily mounted on arbor 50. When the arbor is rotated into the position of FIG. 9, the control knob 54 is readily accessible to an operator who need not be exposed to the insertion mechanism. The cylindrical portion 106 is located on the top of arbor 50. Cylindrical portion 106 has a diameter substantially equal to the inside diameter of the stator. Stator 12 is positioned around cylinder 106 with circular hole 35 on the stator positioned on pin 102 which is located on the arbor. Arbor 50 can be rotated about pivot 53 from its upright mounting position shown in FIG. 10 to the position shown in FIG. 9. A limit switch is activated when the arbor comes into contact with trip 104. Activation of this switch occurs only when the arbor and stator are in the working position shown in FIG. 9. In this position, an individual cavity 20 would be aligned with an insertion mechanism powered by piston 72.

Figure 11:
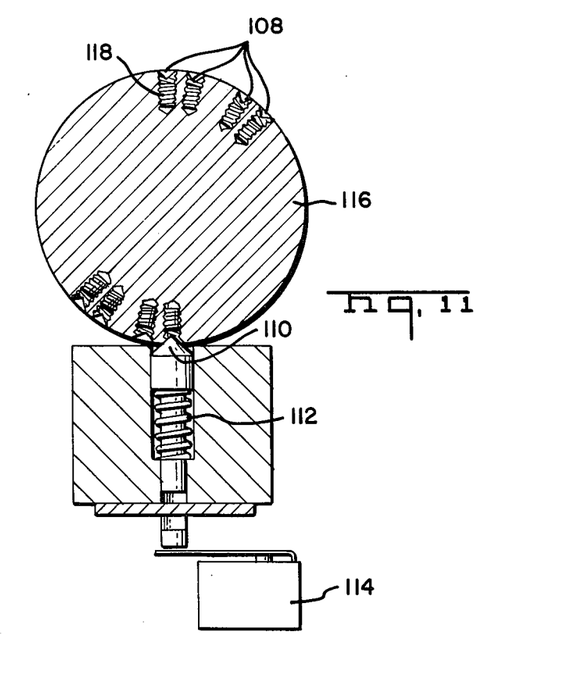
FIG. 11 is a sectional view of the arbor showing a terminal indexing mechanism.

In this embodiment, each terminal cavity is sequentially aligned with the insertion mechanism by rotating knob 54 on the rear of arbor 50. Rotation of this knob indexes the stator to the next terminal position. FIG. 11 is a sectional view showing the indexing mechanism utilized. The core 116 of the arbor has a number of indexing detents 108 aligned with respective terminal cavities 20 and 20'. A detent button 110 is located below the arbor and when this detent button locates an appropriate detent 108, the action of spring 112 results in the activation of limit switch 114. Activation of indexing limit switch 114 and arbor positioning switch 104 are both necessary for proper activation of the insertion and punch mechanism. Each detent 108 has a set screw 118 mounted therein. These set screws can be utilized to seal any particular detent by setting the screw flush with the surface of the arbor. In this way, the assembly mechanism cannot be activated for a given terminal position.

The insertion mechanism is not shown in FIG. 9 but operates along a horizontal path between stator 12 and piston 72. In FIG. 9, the terminal feed track 44 is shown from one end. Terminals are fed along track 44 to a position between stator 12 and the insertion mechanism. Terminal feed arm 46 and feed lever 66 are located immediately above the track 44. An upright terminal punch mechanism operated by piston 58 is also shown in this figure. This punch mechanism is located in alignment with a terminal feed station 90 and is perpendicular to the insertion mechanism.

Figures 4, 7:
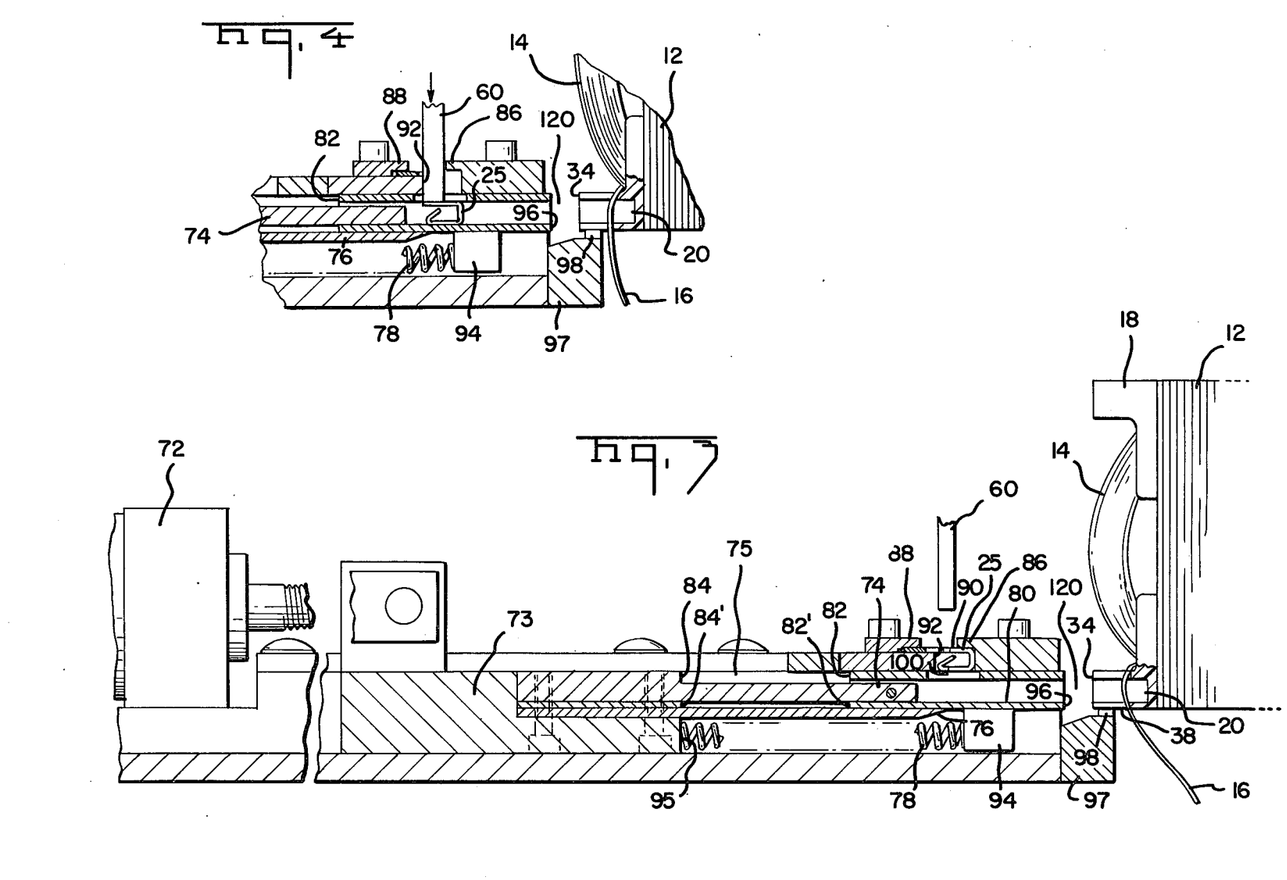
FIG. 4 shows the terminal punch as it severs a single terminal from the carrier strip.
Figure 8:
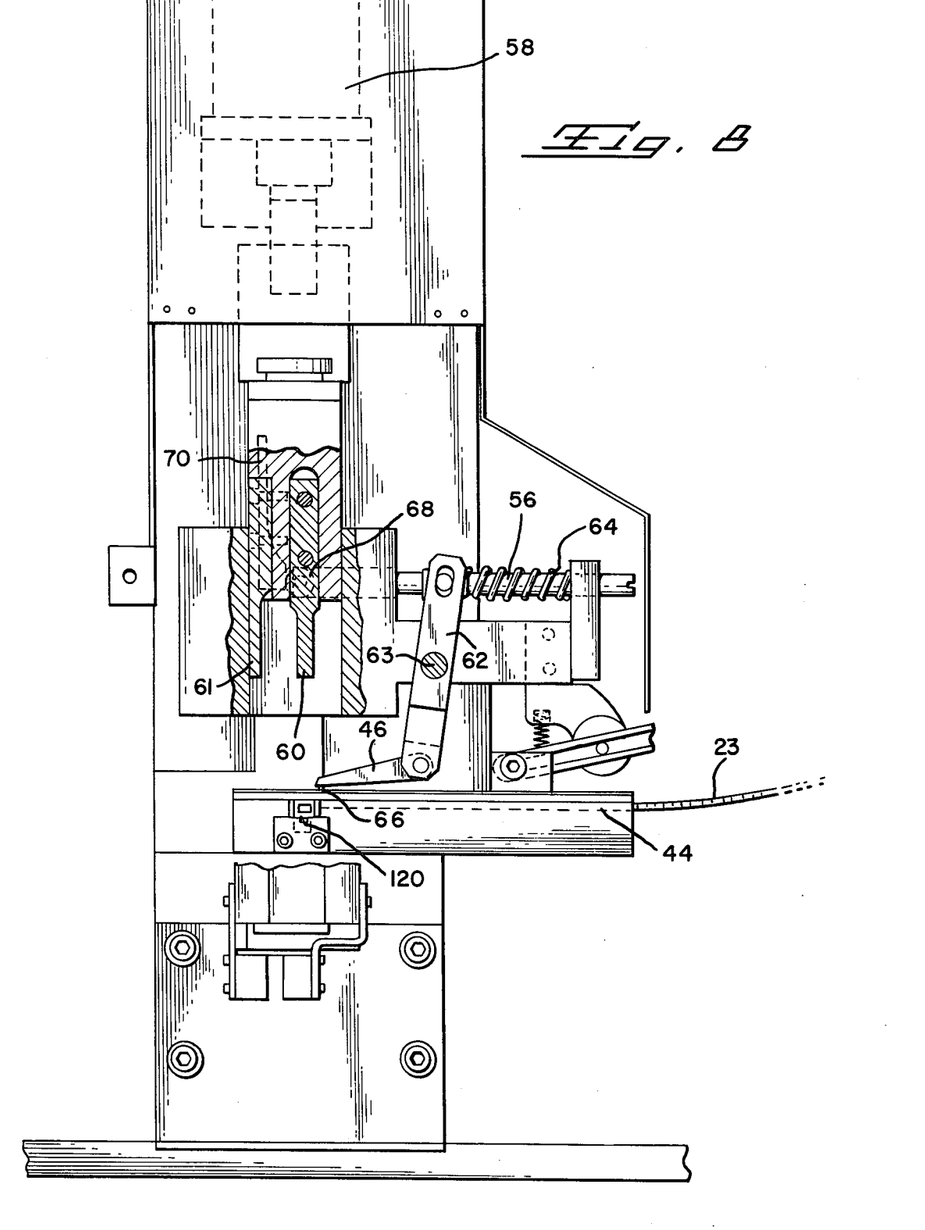
FIG. 8 is a front view showing details of the terminal punch and the terminal feed mechanism.

FIG. 8 is a front view of the terminal punch mechanism used to separate an individual terminal from carrier strip 23. Carrier strip 23 shown on the right of this Figure extends along track 44 to terminal loading station 90 located below the punch mechanism. Piston 58 drives insertion punch 60 down so that each terminal can be separated from strip 23. FIGS. 3 and 4 show this separation. Cover plates 86 and 88 extend along track 44 and beside suitable guides for the carrier strip. On its downward travel, punch 60 strikes an individual terminal 25 severing it from the carrier strip in conjunction with shoulder 92. This forces terminal 25 down into insertion track 80. A second movable punch 61 is located beside punch 60 and moves with punch 60. This punch acts to remove scrap from the ends of the carrier strip.

FIG. 8 also shows the terminal feed mechanism which is actuated by movement of the vertical punch mechanism. A horizontal bar 56 serves as the terminal feed actuator. This actuator is biased to the left in FIG. 8 by the action of spring 64. A cam follower 68 is attached to the left end of the terminal actuator. Terminal feed cam 70 is attached to severing punch 60 so that it undergoes similar vertical translation. The cam follower moves along this terminal feed cam. In FIG. 8, the terminal feed actuator is shown at its maximum rightward deflection. A lever 62 is attached to actuator 56 and is pivoted about point 63. Terminal feed arm 46 is attached to the lower end of lever 62 so that upon full rightward deflection of actuator 56, arm 46 attains its maximum leftward translation. Feed finger 66 comprises a pin located on the left end of feed arm 46. This pin can be mated with individual advanced holes on the carrier strip as shown in FIG. 2. Upon downward travel of terminal punch 60, cam 70 causes actuator 56 to move to the left and consequently feed arm 46 moves to the right. Feed finger 66 has an inclined surface, not shown, which allows appropriate disengagement of the advance hole 24 upon movement of the actuating arm to the right in FIG. 8. In this way, an individual terminal is advanced to terminal feed station 90 and severed from the carrier strip in a single cycle of punch 60.

FIGS. 3-7 show the insertion mechanism and its operation. The insertion mechanism comprises actuating means, such as piston 72, which drives a ram base 73 to the right as viewed in FIG. 3. Terminal insertion ram 74 is located on the right side of ram base 73 and is attached to the ram base at the rearward edge of the ram. Ram 74 comprises a relatively long rod located in a cavity 75. This cavity is aligned with a terminal cavity 20 best shown in FIG. 3. FIG. 3 shows loading station 120 located in the vicinity of the right end of insertion cavity 75 and the left end of terminal cavity 20. An insertion tube or track 80 is located in the right position of cavity 75 adjacent to the terminal cavity 20. Tube 80 has an opening 100 along its upper surface which is located in alignment with terminal punch 60 at terminal feed station 90. As shown in FIG. 4, this allows punch 60 to sever an individual terminal 25 and push it down through opening 100 and into tube 80. The leading edge of insertion ram 74 is within tube 80 in the position illustrated in FIG. 3.

In FIG. 3, the left shoulder or rearward end 82 of tube 80 is spaced a considerable distance from face 84 located on ram base 73. Tube 80 is attached to one end of spring 78. The other end of spring 78 is attached to shoulder 95 on ram base 73. This is the only connection between ram base 73 and tube 80. A cutter bar 76 is located below a portion of tube 80 as shown in FIG. 3. FIG. 8 shows that cutter bar 76 is positioned beside stop 94 and spring 78. A block 97 is attached to the righthand side of the insertion mechanism and is located below terminal cavity 20. The upper surface block 97 is inclined to form an opening 98 for the passage of cutter blade 76.

Figure 5:
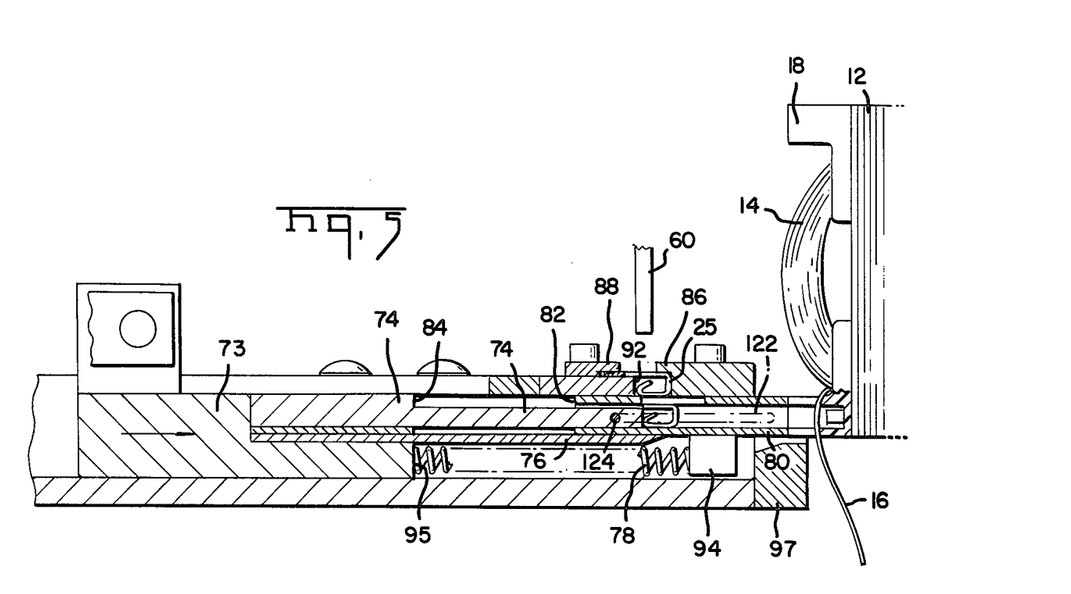
FIG. 5 shows the initial portion of the insertion stroke.

FIGS. 3-6 show one complete cycle of the terminal severing mechanism and the terminal insertion mechanism. FIG. 3 shows a terminal 25 still on the carrier strip and positioned above tube passage 100 at terminal feed station 90. Severing punch 60 and insertion ram 74 are both shown retracted in FIG. 3. The initial step is shown in FIG. 4 as punch 60 moves past shoulder 92 to sever terminal 25 from the carrier strip and force it down into tube 80. Tube 80 is spaced from cavity 20 to allow room for positioning individual cavities in proper position. Terminal 25 is now aligned with terminal cavity 20. Ram base 73 now moves to the right as shown in FIG. 5. Spring 78 exerts a force to the right driving tube 80 in that direction until tube 80 abuts the outer face of terminal cavity 20 at loading station 120. This face thereafter serves as a reference surface. Tube 80 is now aligned with the entrance of cavity 20 forming a continuous passage for terminal 25. As ram base 73 moves to the right, ram 74 and cutter blade 76, both rigidly attached to the ram base 73, also move to the right. By examining the position of stop 94 in FIG. 5, it is apparent that spring 78 has begun to compress since tube 80 now abuts the terminal housing at loading station 120, and further movement to the right is prevented. This structure, therefore, operates as a lost motion connection.

Figure 6:
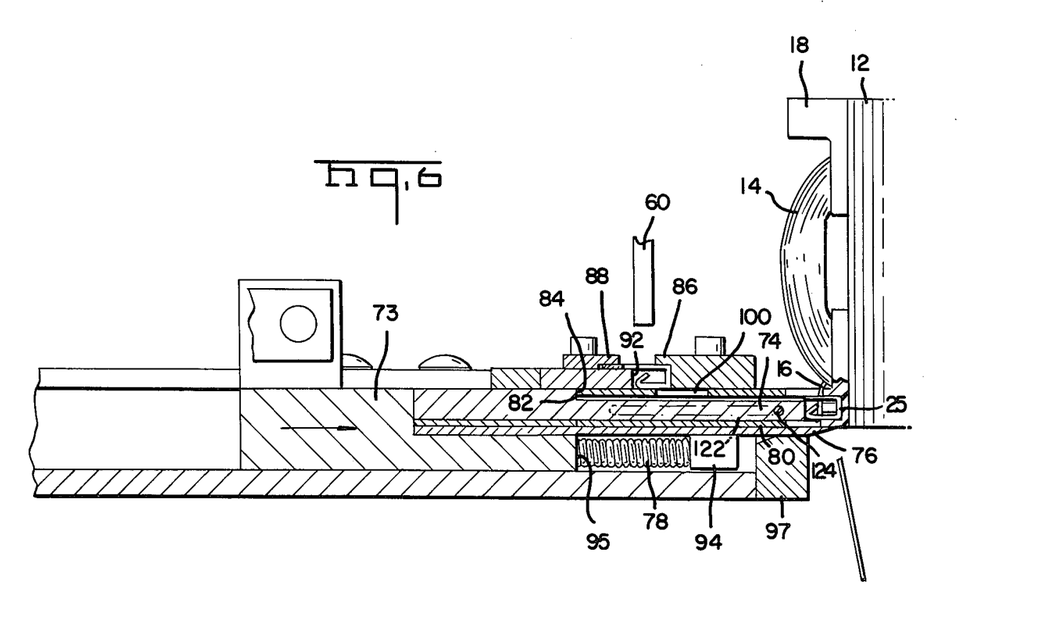
FIG. 6 shows the completion of the insertion stroke with the ram in its extended position.

FIG. 6 shows the culmination of this cycle. Spring 78 has been completely compressed and terminal 25 has been inserted into cavity 20. Coil wire end 16 is now in slot 30 with an electrical contact properly established. Cutter blade 76 has moved through opening 98 which serves to keep cutter blade 76 flush with the outer surface of a terminal housing 18. Cutter blade 76 has severed excess wire as shown.

After completion of the insertion stroke as shown in FIG. 6, the insertion ram 74 returns to the position shown in FIG. 3. A pin 124 located on insertion track 80 engages an appropriate surface 122 on the ram 74 as the ram returns to its retracted position. In that way, the insertion track is also returned to its initial position.

The insertion track 80 does not act only as a guide tube for terminal 25. It also acts as a depth control device. A proper and reliable termination of wire 16 by terminal 25 involves more than merely shoving terminal 25 into cavity 20. Reliable electrical contact between terminal 25 and wire 16 is achieved by accurately positioning wire 16 at the proper depth in slot 31. In that way, the proper stress for sufficient electrical and mechanical contact is exerted on the wire.

A constant predetermined travel by ram 74 will not provide a constant insertion depth for terminal 25 in cavity 20. Due to manufacturing tolerances in the housing and in the laminations used to form the body of stator 12, for example, the lateral position of cavity 20 in FIGS. 3-6 will not always be the same. One solution to this problem would be to provide sufficient travel of the ram so that the front end of terminal 25 bottoms out against the closed end of cavity 20. This is an unacceptable solution because stresses would thereby be generated in the terminal itself which could change the spring characteristics of the terminal. Suitable contact pressure on wire 16 could not then be assured. Utilization of the insertion track 80 as a depth control device as well as a guide tube offers a solution to this problem. This solution results in ram 74 having a variable stroke.

FIG. 6 shows that the rightward movement of ram 76 stops when a second stop means, shoulder 84, abuts a first stop means, lefthand shoulder 82 on insertion track 80. The righthand end of track 80 has previously come to rest against the front end 34 of insulating housing 18. As a result, the incremental difference in length between ram 74 and track 80 will determine the position of terminal 25 relative to the front end 34 of housing 18. The front end 34 is, therefore, used as a datum or reference point for positioning terminal 25. This method also insures that any excess loads will be carried by the housing and will not act to deform the terminal. The insertion stroke is powered by an air cylinder which is not shown. By utilizing an air cylinder in which the piston will not bottom for any possible length of the insertion stroke, the cylinder can act as a spring and will not interfere with the depth control provided by this configuration. This same concept can be used wherever relative motion between a conductor and terminal is imparted to establish a connection and accuracy is desired.

Figure 7A:
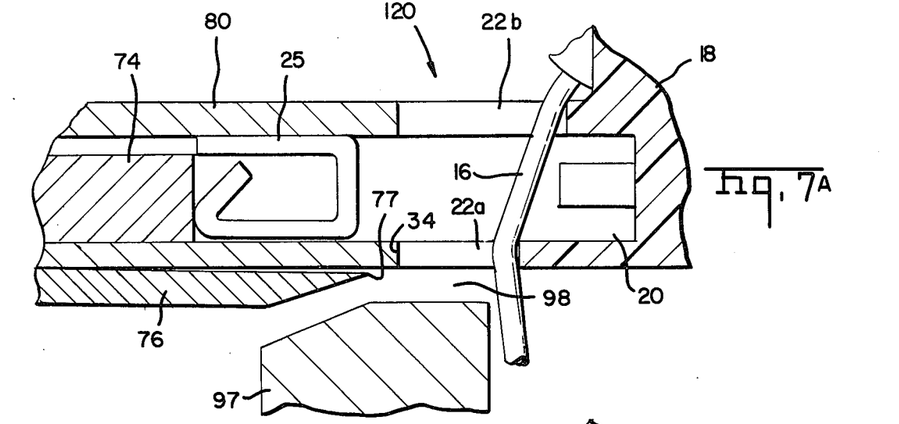
FIGS. 7a, 7b, and 7c show the details of the termination of a wire.
Figure 7B:
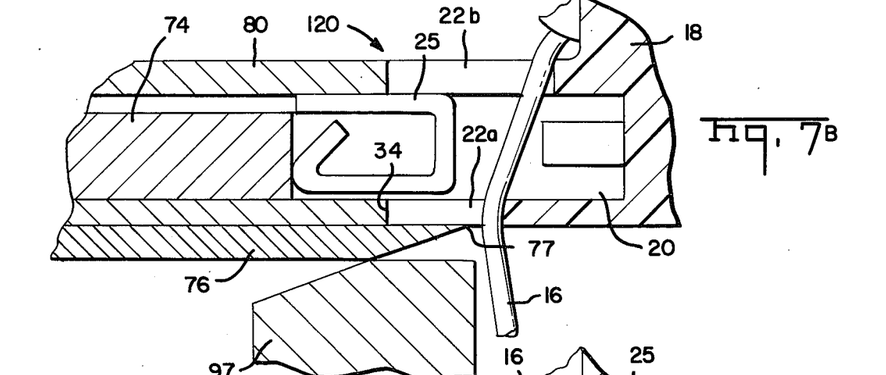
Figure 7C:
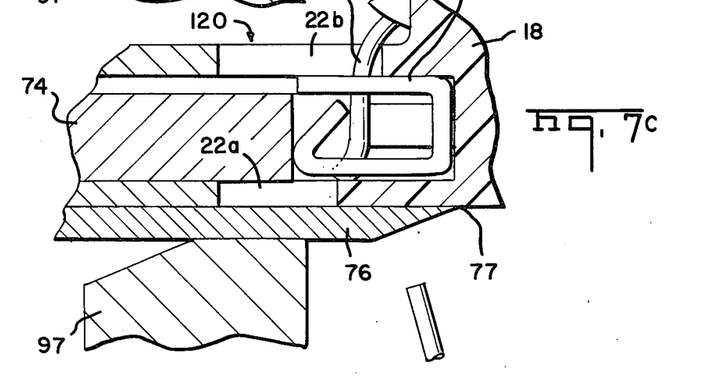

FIGS. 7a, 7b, and 7c show the details of the termination of wire 16 by terminal 25 at loading station 120. FIG. 7A shows terminal 25 prior to its entry into cavity 20. Wire 16 is positioned in cavity slots 22a and 22b so that it spans cavity 20. It should be noted that slot 22b had greater depth than slot 22a. Wire 16, therefore, extends obliquely across cavity 20 from inner slot 22b to outer slot 22a. In FIG. 7a terminal 25 is positioned in insertion track 80. Ram 74 has not yet pushed terminal 25 into cavity 20.

FIG. 7b shows terminal 25 as it initially enters cavity 20. Careful examination shows that the leading edge 77 of cutter blade 76, which moves with ram 74, is positioned ahead of the front end of terminal 25. As a result, and in conjunction with the oblique position of wire 16 in the cavity, wire 16 will be trimmed before it is captured by the slots 30 in terminal 25. When the wire receiving entrance 31, which is not shown in this view, is taken into consideration, it is even more apparent that the wire 16 is severed before it is captured by terminal 25.

FIG. 7b also shows the action of block 97. As the cutter bar moves through opening 98, the upper surface cams cutter blade 76 upward so that it is flush with the outer surface of housing 18. Note that the cutter bar is not fully cammed until after the leading edge 77 passes the front 34 of housing 18, insuring that the cutter blade will not snag the housing.

FIG. 7c shows the completion of the termination. Wire 16 has been severed and has now been captured by the slots in terminal 25. Note that the free end 17 of wire 16 has been drawn into the housing by the continued movement of terminal 25. There is now no exposed conductor along the outer surface of housing 18.

The embodiment shown and described in this invention, represents only one of numerous embodiments which lie within the scope of this invention. Differing embodiments will of necessity result where a terminal or housing differing from the examples dealt with herein, is used. Such differences will not result in a departure from th invention claimed, however. For example, placing the cavities in a rectangular array rather than the circular pattern shown here will result in changes to the mounting and indexing means, while still remaining within the scope of the claims. The tab 26 on terminal 25 could be replaced by an elongated post around which an external wire could be wrapped and then soldered. In that case, the relative lengths of ram 74 and insertion track 80 might not remain the same. The depth control means incorporated within track 80 and ram 74 would, however, be operative regardless of their relative lengths. This invention could also be used with multiple insertion means for simultaneously inserting a plurality of terminals into a plurality of terminal receiving cavities. This invention could be used wherever a terminal and wire are brought into contact by relative motion of the wire and terminal laterally with respect to the axis of the wire.

Changes in construction will occur to those skilled in the art and various apparently different modifications and embodiments may be made without departing from the scope of the invention. The matter set forth in the foregoing description and accompanying drawings is offered by way of illustration only.

What is claimed is:

1. A method of attaching a contact terminal to an electrical conductor and positioning said terminal and said conductor in a terminal receiving cavity in an insulating housing, said terminal having conductor receiving means for establishing electrical contact with said conductor upon relative movement of said terminal towards the axis of said conductor, said method comprising the steps of:

positioning said insulating housing with said cavity in alignment with an elongated insertion ram having a forward end and a rear end, said ram being movable towards and away from said cavity, positioning said conductor between said cavity and said forward end of said ram with said conductor spanning said cavity, positioning said terminal in a guide track between said ram and said conductor with said terminal in alignment with said cavity and with said conductor receiving means in alignment with said conductor, positioning a depth control device having first and second ends with said first end against an appropriate reference surface of said housing and between said housing and a ram stop fixed to said ram and located at said rearward end of said ram, and moving said ram along said guide track with said front end of said ram pushing said terminal into said cavity so that said conductor receiving means establishes electrical contact with said conductor, with further movement of said ram being prevented when said ram stop abuts said second end of said depth control device, whereby the final position of said conductor and said terminal with respect to said reference surface is determined by the relative length of said depth control devices and said ram.

2. A method as set forth in claim 1 wherein said conductor is initially laced into slots on the inner and outer sidewalls of said cavity, said inner slot being deeper than said outer slot so that said conductor initially obliquely spans said cavity.

3. A method as set forth in claim 2 wherein said conductor is cut along said outer sidewall before said terminal has been completely inserted into said cavity, and continued movement of said terminal into said cavity draws the cut end of said conductor into said cavity leaving no exposed conductor on the outside of said housing.

4. A method as set forth in claim 3 wherein the step of positioning said depth control device comprises the movement of said guide track so that the first end of said guide track abuts said reference surface and the opposite end of said guide track comprises said second end of said depth control device.

* * * * *